United States Patent
Kim et al.

(10) Patent No.: US 12,278,338 B2
(45) Date of Patent: Apr. 15, 2025

(54) ELECTROLYTE FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Hyun Seung Kim, Daejeon (KR); Chul Haeng Lee, Daejeon (KR); Yu Ha An, Daejeon (KR); Jeong Woo Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 678 days.

(21) Appl. No.: 17/604,018

(22) PCT Filed: Jun. 16, 2020

(86) PCT No.: PCT/KR2020/007763
§ 371 (c)(1),
(2) Date: Oct. 15, 2021

(87) PCT Pub. No.: WO2020/256373
PCT Pub. Date: Dec. 24, 2020

(65) Prior Publication Data
US 2022/0223910 A1    Jul. 14, 2022

(30) Foreign Application Priority Data
Jun. 18, 2019    (KR) ........................ 10-2019-0072177

(51) Int. Cl.
*H01M 10/0567*    (2010.01)
*H01M 10/0525*    (2010.01)
*H01M 10/0568*    (2010.01)

(52) U.S. Cl.
CPC ... *H01M 10/0567* (2013.01); *H01M 10/0525* (2013.01); *H01M 10/0568* (2013.01); *H01M 2300/0025* (2013.01)

(58) Field of Classification Search
CPC ......... H01M 10/0567; H01M 10/0525; H01M 10/0568; H01M 2300/0025
See application file for complete search history.

(56) References Cited

U.S. PATENT DOCUMENTS

| | | | |
|---|---|---|---|
| 2003/0091905 A1 | 5/2003 | Nobuta et al. | |
| 2003/0165733 A1 | 9/2003 | Takehara et al. | |

(Continued)

FOREIGN PATENT DOCUMENTS

| | | |
|---|---|---|
| CN | 107507999 A | 12/2017 |
| CN | 108475774 A | 8/2018 |

(Continued)

OTHER PUBLICATIONS

International Search Report for PCT/KR2020/007763 dated Oct. 5, 2020, 3 pgs.

(Continued)

*Primary Examiner* — Matthew T Martin
*Assistant Examiner* — Taylor Harrison Krone
(74) *Attorney, Agent, or Firm* — Lerner David LLP

(57) ABSTRACT

An electrolyte for a lithium secondary battery and a lithium secondary battery including the same are disclosed herein. In some embodiments, an electrolyte for a lithium secondary battery includes a lithium salt, an organic solvent, and a compound represented by Formula 1. In some embodiments, a lithium secondary battery includes a positive electrode, a negative electrode, and the electrolyte.

10 Claims, 4 Drawing Sheets

(56) References Cited

U.S. PATENT DOCUMENTS

| | | |
|---|---|---|
| 2005/0042519 A1 | 2/2005 | Roh et al. |
| 2005/0135045 A1 | 6/2005 | Nobuta et al. |
| 2011/0052999 A1 | 3/2011 | Lee et al. |
| 2011/0104565 A1 | 5/2011 | Utsumi |
| 2014/0134501 A1* | 5/2014 | Li .................. H01M 10/052 429/188 |
| 2014/0342239 A1 | 11/2014 | Lee et al. |
| 2014/0349176 A1 | 11/2014 | Egorov et al. |
| 2017/0358815 A1 | 12/2017 | Chang et al. |
| 2018/0301693 A1 | 10/2018 | Choi et al. |
| 2019/0267673 A1 | 8/2019 | Park et al. |

FOREIGN PATENT DOCUMENTS

| | | | |
|---|---|---|---|
| CN | 109314279 A | 2/2019 | |
| EP | 1317013 A1 | 6/2003 | |
| JP | 2003092137 A | 3/2003 | |
| JP | 2005060266 A | 3/2005 | |
| JP | 2006302756 A | 11/2006 | |
| JP | 2008034600 A | 2/2008 | |
| JP | 2008195954 A | 8/2008 | |
| JP | 2009117081 A | 5/2009 | |
| JP | 2015191806 A | 11/2015 | |
| JP | 2015534254 A | 11/2015 | |
| KR | 20030032863 A | 4/2003 | |
| KR | 20040006057 * | 1/2004 | ........ H01M 10/0567 |
| KR | 20040006057 A | 1/2004 | |
| KR | 20090079571 A | 7/2009 | |
| KR | 20140137054 A | 12/2014 | |
| KR | 20180036600 A | 4/2018 | |
| WO | 2004006378 A1 | 1/2004 | |
| WO | 2009157261 A1 | 12/2009 | |
| WO | 2011-023110 A1 | 3/2011 | |

OTHER PUBLICATIONS

Hu, Y. et al. 1,3,4-Thiadiazole: Synthesis, Reactions, and Applications in Medicinal, Agricultural, and Materials Chemistry. Chem. Rev. 2014, vol. 114, pp. 5572-5610.

Extended European Search Report including Written Opinion for Application No. 20826954.8 dated Apr. 20, 2022, pp. 1-8.

* cited by examiner

ELECTROLYTE FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2020/007763, filed on Jun. 16, 2020, which claims priority from Korean Patent Application No. 10-2019-0072177, filed on Jun. 18, 2019, the disclosure of which is incorporated by reference herein.

TECHNICAL FIELD

The present invention relates to an electrolyte for a lithium secondary battery and a lithium secondary battery including the same, and more particularly, to an electrolyte for a lithium secondary battery, which may suppress a self-discharge phenomenon of the lithium secondary battery by suppressing dissolution of transition metal in a positive electrode, and a lithium secondary battery including the same.

BACKGROUND ART

There is a need to develop technology for efficiently storing and utilizing electrical energy as personal IT devices and computer networks are developed with the development of information society and the accompanying dependency of society as a whole on the electrical energy is increased.

A technology based on secondary batteries is the most suitable technology for various applications, wherein, since a secondary battery may be miniaturized, it is applicable to a personal IT device, and it is also applicable to a large device such as a power storage device.

Among these secondary battery technologies, lithium ion batteries, which are battery systems having the theoretically highest energy density, are in the spotlight.

The lithium ion battery is largely composed of a positive electrode formed of a transition metal oxide containing lithium, a negative electrode capable of storing lithium, an electrolyte that becomes a medium for transferring lithium ions, and a separator, and, among them, a significant amount of research on the electrolyte has been conducted while the electrolyte is known as a component that greatly affects stability and safety of the battery.

The electrolyte causes a reduction decomposition reaction on a negative electrode interface during an activation process of the battery to form a solid electrolyte interphase (SEI). The SEI suppresses additional decomposition of an electrolyte solution and may transmit lithium ions.

Transition metal ions may be dissolved from a positive electrode active material by a decomposition product of a lithium salt included in the electrolyte under high-temperature conditions, and the dissolved transition metal ions may be re-deposited to the positive electrode to increase resistance of the positive electrode. Also, the dissolved transition metal ions may be electrodeposited on the negative electrode interface thorough the electrolyte to cause a self-discharge phenomenon of the negative electrode, and may decompose the SEI formed on a surface of the negative electrode to reduce passivation ability of the SEI.

Thus, there is an urgent need for research into an electrolyte which includes a component capable of scavenging the decomposition product of the lithium salt.

Prior Art Document: International Patent Publication No. 2009-157261

DISCLOSURE OF THE INVENTION

Technical Problem

An aspect of the present invention provides an electrolyte for a lithium secondary battery, which may suppress an electrolyte decomposition reaction and may minimize generation of a lithium salt decomposition product and a transition metal ion dissolution phenomenon in a positive electrode even when the lithium secondary battery is operated under high-temperature conditions, and a lithium secondary battery including the same.

Technical Solution

According to an aspect of the present invention, there is provided an electrolyte for a lithium secondary battery which includes: a lithium salt, an organic solvent, and a compound represented by Formula 1.

[Formula 1]

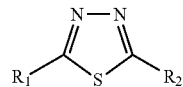

In Formula 1,
$R_1$ and $R_2$ are each independently an alkyl group having 1 to 3 carbon atoms.

According to another aspect of the present invention, there is provided a lithium secondary battery including a positive electrode, a negative electrode, and the electrolyte for a lithium secondary battery.

Advantageous Effects

Since an electrolyte for a lithium secondary battery according to the present invention may not only suppress an additional electrolyte decomposition reaction and minimize generation of a decomposition product of a lithium salt even when the lithium secondary battery is stored or repeatedly charged and discharged at high temperatures but may also minimize dissolution of transition metal ions in a positive electrode, a lithium secondary battery having improved high-temperature life characteristics and resistance characteristics may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
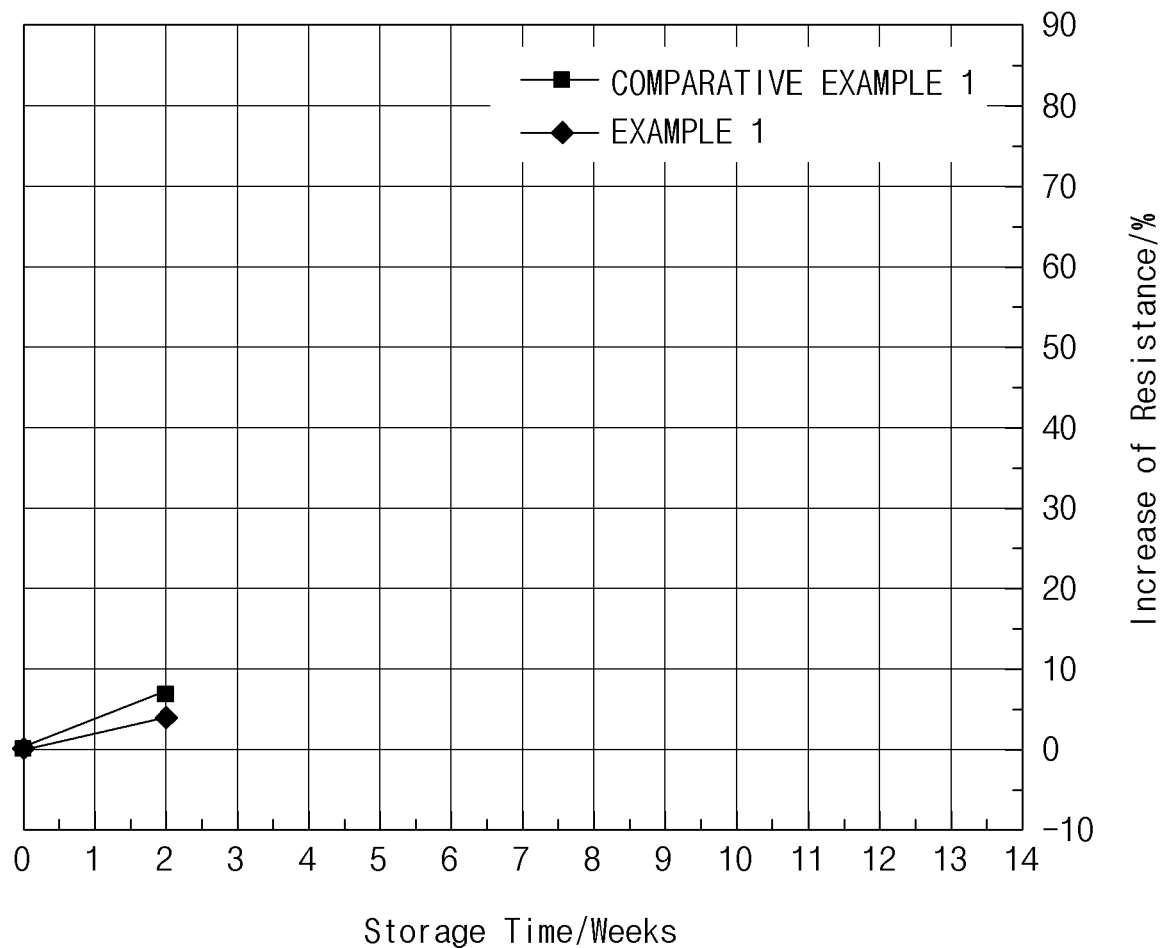
FIG. 1 is a graph illustrating the results of evaluation of resistance increase rates (%) after high-temperature (60° C.) storage according to Experimental Example 1.

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Electrolyte for Lithium Secondary Battery

An electrolyte for a lithium secondary battery according to the present invention includes: a lithium salt, an organic solvent, and an additive including a compound represented by Formula 1 below.

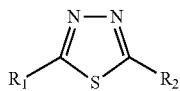

[Formula 1]

In Formula 1, $R_1$ and $R_2$ are each independently an alkyl group having 1 to 3 carbon atoms.

(1) Lithium Salt

First, a lithium salt will be described.

The lithium salt is used as a medium for transferring ions in a lithium secondary battery, wherein it is desirable that the lithium salt is included in a concentration of 0.1 M to 3 M, preferably 0.8 M to 2.5 M, and more preferably 1 M to 1.5 M in the electrolyte for a lithium secondary battery. In a case in which the lithium salt is included within the above range, an increase in resistance in the battery may be prevented by preventing decomposition of a solid electrolyte interphase (SEI) formed on an electrode interface when the battery is operated at a high voltage while minimizing a by-product generated by the dissolution of the lithium salt in the electrolyte.

For example, the lithium salt may include at least one compound selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$.

Particularly, among the lithium salts, $LiPF_6$ is widely used because it has relatively higher ionic conductivity than other lithium salts. However, in a case in which an organic solvent included in an electrolyte is decomposed at high temperature, $PF_6^-$, as an anion, may be decomposed at high temperature or by-products, such as HF and $PF_5$, may be generated due to moisture included in the electrolyte. The by-products, such as HF and $PF_5$, may be a cause of destructing the SEI on a surface of an electron-rich negative electrode as described above or dissolving transition metal ions from a positive electrode.

Thus, in order to suppress a side reaction due to the by-products, the present invention aims at providing the compound represented by Formula 1, as an additive for forming an SEI, which may scavenge the Lewis acid by-products and may simultaneously suppress the side reaction of the Lewis acid by-products at high temperatures by being reduced on the surface of the negative electrode.

(2) Organic Solvent

Next, the organic solvent will be described.

Various organic solvents typically used in a lithium electrolyte may be used as the organic solvent without limitation. For example, the organic solvent may include a cyclic carbonate-based organic solvent, a linear carbonate-based organic solvent, or a mixed organic solvent thereof.

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include at least one of ethylene carbonate and propylene carbonate (PC).

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

It is desirable that an electrolyte having high electrical conductivity may be prepared if a linear carbonate organic solvent is mixed with a cyclic carbonate organic solvent in an appropriate ratio and used as the organic solvent. Specifically, the cyclic carbonate organic solvent and the linear carbonate organic solvent may be used by being mixed in a volume ratio of 1:9 to 5:5, for example, 2:8 to 3:7.

Furthermore, the organic solvent may further include an ester (acetates and propionates) organic solvent having low melting point and high stability at high temperature, for example, a linear ester-based organic solvent and/or a cyclic ester-based organic solvent in the cyclic carbonate-based organic solvent and/or the linear carbonate-based organic solvent to prepare an electrolyte solution having high ionic conductivity.

Typical examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

If necessary, the organic solvent may be further mixed with an amide compound or a nitrile compound and used.

(3) Additive: Compound Represented By Formula 1

Next, the electrolyte for a lithium secondary battery of the present invention includes a compound represented by the following Formula 1 as an additive.

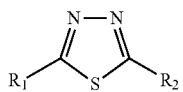

[Formula 1]

In Formula 1, $R_1$ and $R_2$ are each independently an alkyl group having 1 to 3 carbon atoms.

An electrolyte for a lithium secondary battery generally includes a lithium salt such as $LiPF_6$, and the lithium salt generates a Lewis acid by-product, such as $PF_5$ or HF, when the lithium salt is decomposed in the electrolyte under high-temperature conditions. The Lewis acid by-product may dissolve transition metal ions in a positive electrode active material, and the dissolved transition metal ions may be re-deposited on a surface of the positive electrode to increase resistance of the positive electrode. The transition metal ions may be electrodeposited on a negative electrode interface thorough the electrolyte and may react with components constituting a solid electrolyte interphase (SEI) on the electrode interface or an organic solvent to cause a decomposition reaction, and thus, the transition metal ions may reduce passivation ability of the SEI.

Thus, it is necessary to scavenge the Lewis acid compound, as a high-temperature decomposition product of the lithium salt, in order to address problems, such as an increase in resistance in the battery and a degradation of battery life characteristics, due to the generation of the decomposition reaction product by suppressing the decomposition reaction of the SEI under high-temperature conditions.

Thus, in the present invention, the compound represented by Formula 1 corresponding to a Lewis base, which may react with the Lewis acid, was used as the electrolyte additive. Since the compound represented by Formula 1 contains an electron-rich sulfur (S) element in a ring, it acts as the Lewis base. That is, since it provides electrons to the Lewis acid decomposition product such as HF or $PF_5$, it performs a Lewis acid-base reaction with the Lewis acid decomposition product instead of the components constituting the SEI formed on the surface of the negative electrode or a transition metal oxide in the positive electrode.

Also, since the compound represented by Formula 1 contains a double bond in its molecular structure, it has excellent reducibility on the surface of the negative electrode during initial charge of the lithium secondary battery. Thus, the compound represented by Formula 1 may preferentially be reductively decomposed to improve the components of the SEI so that the SEI formed on the surface of the negative electrode may suppress the side reaction of the Lewis acid by-product derived from the lithium salt.

Specifically, the compound represented by Formula 1 may include at least one selected from the group consisting of compounds represented by Formulae 1A to 1C below.

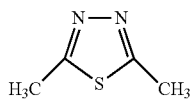

[Formula 1A]

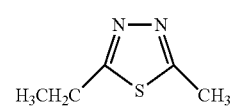

[Formula 1B]

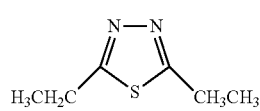

[Formula 1C]

The compound represented by Formula 1 may be included in an amount of 0.1 part by weight to 10 parts by weight, preferably 0.1 part by weight to 5 parts by weight, and more preferably 0.1 part by weight to 3 parts by weight based on 100 parts by weight of the electrolyte for a lithium secondary battery. In a case in which the compound represented by Formula 1 is included in an amount within the above range, an effective SEI may not only be formed on the surface of the negative electrode, but the Lewis acid by-products derived from the lithium salt, for example, HF and $PF_5$, may be effectively scavenged. However, in a case in which the compound represented by Formula 1 is included in an amount greater than the above range, a decomposition reaction may excessively occur to increase initial resistance of the lithium secondary battery, and, in a case in which the compound represented by Formula 1 is included in an amount less than the above range, an effect as an additive may be insignificant.

(4) Other Additives

The electrolyte for a lithium secondary battery of the present invention may additionally further include other additives which may form a stable film on the surfaces of the negative electrode and the positive electrode while not significantly increasing the initial resistance in addition to the effect from the compound represented by Formula 1, or which may act as a complementary agent for suppressing the decomposition of the solvent in the electrolyte for a lithium secondary battery and improving mobility of lithium ions.

These other additives are not particularly limited as long as these are additives capable of forming a stable film on the surfaces of the positive electrode and the negative electrode. As a representative example, the other additive may include at least one selected from the group consisting of a halogen-substituted or unsubstituted carbonate-based compound, a vinyl silane-based compound, a phosphate-based compound, a phosphite-based compound, a sulfite-based compound, a sulfone-based compound, a sulfate-based compound, a sultone-based compound, a halogen-substituted carbonate-based compound, a halogen-substituted benzene-based compound, a nitrile-based compound, a borate-based compound, and a lithium salt-based compound.

Specifically, the other additive may include at least one compound selected from the group consisting of a vinyl silane-based compound, a phosphate-based compound, a sulfate-based compound, a sultone-based compound, a halogen-substituted benzene-based compound, and a borate-based compound.

The halogen-substituted or unsubstituted carbonate-based compound may include vinylene carbonate (VC) or fluoroethylene carbonate (FEC).

The vinyl silane-based compound may improve durability of the battery by forming a stable film through electrochemical reduction on the surface of the negative electrode. Specifically, tetravinylsilane (TVS) may be included as the vinyl silane-based compound.

The phosphate-based or phosphite-based compound is a component for assisting the formation of the SEI by being electrochemically decomposed on the surfaces of the positive electrode and the negative electrode, wherein an effect of improving long-term cycle life characteristics of the secondary battery may be achieved by the phosphate-based or phosphite-based compound. Representative examples thereof may be at least one compound selected from the group consisting of lithium difluoro(bisoxalato)phosphate, lithium difluorophosphate (LiDFP), tris(trimethylsilyl) phosphate (TMSPa), tris(trimethylsilyl) phosphite (TMSPi), tris(2,2,2-trifluoroethyl) phosphate (TFEPa), and tris(trifluoroethyl) phosphite (TFEPi).

The sulfite-based compound may include at least one compound selected from the group consisting of ethylene sulfite, methylethylene sulfite, ethylethylene sulfite, 4,5-dimethylethylene sulfite, 4,5-diethylethylene sulfite, propylene sulfite, 4,5-dimethylpropylene sulfite, 4,5-diethylpropylene sulfite, 4,6-dimethylpropylene sulfite, 4,6-diethylpropylene sulfite, and 1,3-butylene glycol sulfite.

The sulfone-based compound may include at least one compound selected from the group consisting of divinyl sulfone, dimethyl sulfone, diethyl sulfone, methylethyl sulfone, and methylvinyl sulfone.

The sulfate-based compound may include ethylene sulfate (Esa), trimethylene sulfate (TMS), and methyl trimethylene sulfate (MTMS).

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The halogen-substituted benzene-based compound may include fluorobenzene (FB).

Also, the nitrile-based compound may include at least one compound selected from the group consisting of succinonitrile (SN), adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The borate-based compound may include lithium oxalyldifluoroborate (LiODFB), lithium bis(oxalato)borate (LiB$(C_2O_4)_2$; LiBOB), or lithium tetrafluoroborate (LiBF$_4$).

The lithium salt-based compound is a compound different from the lithium salt included in the electrolyte, wherein the lithium salt-based compound may be LiPO$_2$F$_2$.

The compounds listed as the other additives may be included alone or as a mixture of two or more thereof, and may be included in an amount of 1 part by weight to 40 parts by weight based on 100 parts by weight of the electrolyte for a lithium secondary battery, particularly 1 part by weight to 30 parts by weight based on 100 parts by weight of the electrolyte for a lithium secondary battery, and more particularly 1 part by weight to 20 parts by weight based on 100 parts by weight of the electrolyte for a lithium secondary battery.

If the amount of the other additives is greater than the above range, a side reaction in the electrolyte may occur excessively during charge and discharge of the battery, and, since an excessive decomposition reaction may occur at high temperatures, the initial resistance of the lithium secondary battery may be increased, or the resistance may be continuously increased during charge and discharge of the lithium secondary battery to degrade discharge capacity and life characteristics of the battery.

Lithium Secondary Battery

Next, a lithium secondary battery according to the present invention will be described.

The lithium secondary battery according to an embodiment of the present invention includes a positive electrode, a negative electrode, and the electrolyte for a lithium secondary battery, and may optionally further include a separator which may be disposed between the positive electrode and the negative electrode. In this case, since the electrolyte for a lithium secondary battery is the same as described above, a detailed description thereof will be omitted.

(1) Positive Electrode

The positive electrode may be prepared by coating a positive electrode collector with a positive electrode active material slurry including a positive electrode active material, a binder for an electrode, a conductive agent for an electrode, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. In this case, the positive electrode collector may have fine surface roughness to improve bonding strength with the positive electrode active material, and the positive electrode collector may be used in various shapes such as a film, a sheet, a foil, a net, a porous body, a foam body, a non-woven fabric body, and the like.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., LiMnO$_2$, LiMn$_2$O$_4$, etc.), lithium-cobalt-based oxide (e.g., LiCoO$_2$, etc.), lithium-nickel-based oxide (e.g., LiNiO$_2$, etc.), lithium iron-phosphate-based positive electrode material (e.g., LiFePO$_4$), lithium-nickel-manganese-based oxide (e.g., LiNi$_{1-Y1}$Mn$_{Y1}$O$_2$ (where 0<Y1<1), LiMn$_{2-Z1}$Ni$_{Z1}$O$_4$ (where 0<Z1<2), etc.), lithium-nickel-cobalt-based oxide (e.g., LiNi$_{1-Y2}$Co$_{Y2}$O$_2$ (where 0<Y2<1), lithium-manganese-cobalt-based oxide (e.g., $LiCo_{1-Y3}Mn_{Y3}O_2$ (where $0<Y3<1$), $LiMn_{2-Z2}Co_{Z2}O_4$ (where $0<Z2<2$), etc.), lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$) or $Li(Ni_{p2}Co_{q2}Mn_{r2})O_4$ (where $0<p2<2$, $0<q2<2$, $0<r2<2$, and $p2+q2+r2=2$), etc.), or lithium-nickel-cobalt-transition metal (M) oxide (e.g., $Li(Ni_{p3}Co_{q3}Mn_{r3}M_{S1})O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s1 are atomic fractions of each independent elements, wherein $0<p3<1$, $0<q3<1$, $0<r3<1$, $0<S1<1$, and $p3+q3+r3+S1=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, $LiFePO_4$, $LiMn_2O_4$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $LiNi_{0.8}CO_{0.15}Al_{0.05}O_2$ etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$ $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The binder for an electrode is a component that assists in the binding between the positive electrode active material and the electrode conductive agent and in the binding with the current collector. Specifically, the binder may include polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene (PE), polypropylene, an ethylene-propylene-diene terpolymer, a styrene-butadiene rubber, styrene-butadiene rubber-carboxymethylcellulose (SBR-CMC), a fluoro rubber, various copolymers, and the like.

The conductive agent for an electrode is a component for further improving the conductivity of the positive electrode active material. Any conductive agent for an electrode may be used without particular limitation so long as it has conductivity without causing adverse chemical changes in the battery, and, for example, a conductive material, such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as optionally the binder for a positive electrode and the conductive agent for a positive electrode is included.

(2) Negative Electrode

The negative electrode, for example, may be prepared by coating a negative electrode collector with a negative electrode active material slurry including a negative electrode active material, a binder for an electrode, a conductive agent for an electrode, and a solvent.

The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

The negative electrode active material may further include at least one compound selected from the group consisting of a silicon-based compound represented by $SiO_x$ ($0<x\leq2$); a graphite-based material such as natural graphite, artificial graphite, and Kish graphite; lithium-containing titanium composite oxide (LTO); metals (Me) such as tin (Sn), lithium (Li), zinc (Zn), Mg, cadmium (Cd), cerium (Ce), nickel (Ni), or Fe; alloys composed of the metals (Me); oxides of the metals (Me); and composites of the metals (Me) and carbon.

Since the binder for an electrode, the conductive agent for an electrode, and the solvent are the same as described above, detailed descriptions thereof will be omitted.

(3) Separator

A typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator, and a polyolefin-based porous polymer film coated with inorganic particles (e.g. $Al_2O_3$) or a typical porous nonwoven fabric, for example, a nonwoven fabric formed of high melting point glass fibers or polyethylene terephthalate fibers may be used, but the present invention is not limited thereto.

Hereinafter, the present invention will be described in detail, according to specific examples. However, the following examples are merely presented to exemplify the present invention, and the scope of the present invention is not limited thereto. It will be apparent to those skilled in the art that various modifications and alterations are possible within the scope and technical spirit of the present invention. Such modifications and alterations fall within the scope of claims included herein.

EXAMPLES

1. Example 1

(1) Preparation of Electrolyte for Lithium Secondary Battery

An electrolyte for a lithium secondary battery was prepared by adding 0.5 g of the compound represented by Formula 1A, and 0.1 g of tetravinylsilane (hereinafter, referred to as "TVS"), 1 g of lithium difluorophosphate (hereinafter, referred to as "LiDFP"), 1 g of ethylene sulfate (hereinafter, referred to as "ESa"), 0.2 g of lithium tetrafluoroborate (hereinafter, referred to as "LiBF$_4$"), 6 g of fluorobenzene (hereinafter, referred to as "FB"), and 0.5 g of 1,3-propane sultone (hereinafter, referred to as "PS"), as other additives, to 90.7 g of an organic solvent (ethylene carbonate:ethyl methyl carbonate=3:7 volume ratio) in which 1.0 M LiPF$_6$ was dissolved.

(2) Lithium Secondary Battery Preparation

A positive electrode active material (Li(Ni$_{0.8}$Mn$_{0.1}$Co$_{0.1}$)O$_2$), carbon black as a conductive agent, and polyvinylidene fluoride (PVDF), as a binder, were mixed in a weight ratio of 97.5:1:1.5 and then added to N-methyl-2-pyrrolidone (NMP), as a solvent, to prepare a positive electrode active material slurry (solid content: 50 wt %). An about 12 μm thick aluminum (Al) thin film, as a positive electrode collector, was coated with the positive electrode active material slurry, dried, and then roll-pressed to prepare a positive electrode.

A negative electrode active material (SiO:graphite=5:95 weight ratio), carbon black as a conductive agent, and styrene-butadiene rubber-carboxymethylcellulose (SBR-CMC), as a binder, were mixed in a weight ratio of 95:1.5:3.5 and then added to water, as a solvent, to prepare a negative electrode active material slurry (solid content: 60 wt %). An about 6 μm thick copper (Cu) thin film, as a negative electrode collector, was coated with the negative electrode active material slurry, dried, and then roll-pressed to prepare a negative electrode.

An electrode assembly was prepared by sequentially stacking the positive electrode, a polyolefin-based porous separator coated with inorganic particles (Al$_2$O$_3$), and the negative electrode. Thereafter, the electrode assembly was accommodated in a pouch-type battery case, and the electrolyte for a lithium secondary battery was injected thereinto to prepare a pouch-type lithium secondary battery.

2. Example 2

(1) Preparation of Electrolyte for Lithium Secondary Battery

An electrolyte for a lithium secondary battery was prepared by adding 0.5 g of the compound represented by Formula 1A, and 0.1 g of TVS, 1 g of LiDFP, 1 g of ESa, 0.2 g of LiBF$_4$, and 0.5 g of PS, as other additives, to 96.7 g of an organic solvent (ethylene carbonate:ethyl methyl carbonate:dimethyl carbonate=3:5:2 volume ratio) in which 1.2 M LiPF$_6$ was dissolved, when the electrolyte for a lithium secondary battery was prepared.

(2) Lithium Secondary Battery Preparation

A lithium secondary battery was prepared in the same manner as in Example 1 except that graphite was only used as a negative electrode active material.

COMPARATIVE EXAMPLES

1. Comparative Example 1

(1) Preparation of Electrolyte for Lithium Secondary Battery

An electrolyte for a lithium secondary battery was prepared by not adding the compound represented by Formula 1A, and adding 0.1 g of tetravinylsilane (hereinafter, referred to as "TVS"), 1 g of lithium difluorophosphate (hereinafter, referred to as "LiDFP"), 1 g of ethylene sulfate (hereinafter, referred to as "ESa"), 0.2 g of lithium tetrafluoroborate (hereinafter, referred to as "LiBF$_4$"), 6 g of fluorobenzene (hereinafter, referred to as "FB"), and 0.5 g of 1,3-propane sultone (hereinafter, referred to as "PS"), as other additives, to 91.2 g of an organic solvent (ethylene carbonate:ethyl methyl carbonate=3:7 volume ratio) in which 1.0 M LiPF$_6$ was dissolved.

(2) Lithium Secondary Battery Preparation

A lithium secondary battery was prepared in the same manner as in Example 1 except that the above-prepared electrolyte for a lithium secondary battery was used.

2. Comparative Example 2

(1) Preparation of Electrolyte for Lithium Secondary Battery

An electrolyte for a lithium secondary battery was prepared by not adding the compound represented by Formula 1A, and adding 0.1 g of TVS, 1 g of LiDFP, 1 g of ESa, 0.2 g of LiBF$_4$, and 0.5 g of PS, as other additives, to 97.2 g of an organic solvent (ethylene carbonate:ethyl methyl carbonate:dimethyl carbonate=3:5:2 volume ratio) in which 1.2 M LiPF$_6$ was dissolved.

(2) Lithium Secondary Battery Preparation

A lithium secondary battery was prepared in the same manner as in Example 2 except that the above-prepared electrolyte for a lithium secondary battery was used.

Experimental Examples

1. Experimental Example 1: Evaluation of Resistance Increase Rate (%) After High-Temperature (60° C.) Storage After each of the lithium secondary batteries prepared in Example 1 and Comparative Example 1 was activated at a constant current (CC) of 0.1 C, degassing was performed.

Thereafter, each lithium secondary battery was charged at a CC of 0.33 C to 4.20 V under a constant current-constant voltage (CC-CV) condition at 25° C., then subjected to 0.05 C current cut-off, and discharged at a CC of 0.33 C to 2.5 V. The above charging and discharging were defined as one cycle, cycles were performed, and, then, after each lithium secondary battery was charged to a state of charge (SOC) of 50%, direct current internal resistance (hereinafter, referred to as "DC-iR") was calculated by a voltage drop obtained in a state in which each lithium secondary battery was subjected to a discharge pulse at 2.5 C for 10 seconds and was defined as initial resistance. The voltage drop was measured using PNE-0506 charge/discharge equipment (manufacturer: PNE SOLUTION Co., Ltd., 5 V, 6 A). Then, each lithium secondary battery was recharged at a CC of 0.33 C to a state of charge (SOC) of 100%, then stored at a high temperature (60° C.) for 2 weeks, charged at a CC of 0.33 C to 4.20 V under a constant current-constant voltage (CC-CV) condition, subjected to 0.05 C current cut-off, and discharged at a CC of 0.33 C to 2.5 V.

Next, after each lithium secondary battery was charged to a state of charge (SOC) of 50%, DC-iR was calculated by a voltage drop obtained in a state in which each lithium secondary battery was subjected to a discharge pulse at 2.5 C for 10 seconds, and was defined as resistance after 2 weeks storage. The voltage drop was measured using PNE-0506 charge/discharge equipment (manufacturer: PNE SOLUTION Co., Ltd., 5 V, 6 A).

The respectively measured initial resistance and resistance after 2 weeks storage were substituted into the following [Equation 1] to calculate a resistance increase rate (%), and the results thereof are presented in FIG. 1.

Resistance increase rate (%)={(resistance after 2 weeks storage at high temperature−initial resistance)/initial resistance}×100   [Equation 1]

Referring to FIG. 1, it may be confirmed that the secondary battery of Example 1 had a lower resistance increase rate after 2 weeks storage at a high temperature (60° C.) than the secondary battery of Comparative Example 1.

2. Experimental Example 2: Evaluation of Capacity Retention (%) After High-Temperature (45° C.) Charge and Discharge After each of the secondary batteries prepared in Example 1 and Comparative Example 1 was activated at a CC of 0.1 C, degassing was performed. Thereafter, each secondary battery was charged at a CC of 0.33 C to 4.20 V under a constant current-constant voltage (CC-CV) condition at 25° C., then subjected to 0.05 C current cut-off, and discharged at a CC of 0.33 C to 2.5 V.

Next, each secondary battery was charged at a CC of 0.33 C to 4.20 V under a constant current-constant voltage (CC-CV) condition at 45° C., then subjected to 0.05 C current cut-off, and discharged at a CC of 0.33 C to 2.5 V. The above charging and discharging were defined as one cycle, 100 cycles of the charging and discharging were performed at a high temperature (45° C.), and discharge capacities were then measured using PNE-0506 charge/discharge equipment (manufacturer: PNE SOLUTION Co., Ltd., 5 V, 6 A). The discharge capacities measured were substituted into the following [Equation 2] to calculate capacity retention (%), and the results thereof are presented in FIG. 2.

Capacity retention (%)=(discharge capacity after 100 cycles/discharge capacity after 1 cycle)×100   [Equation 2]

Figure 2:
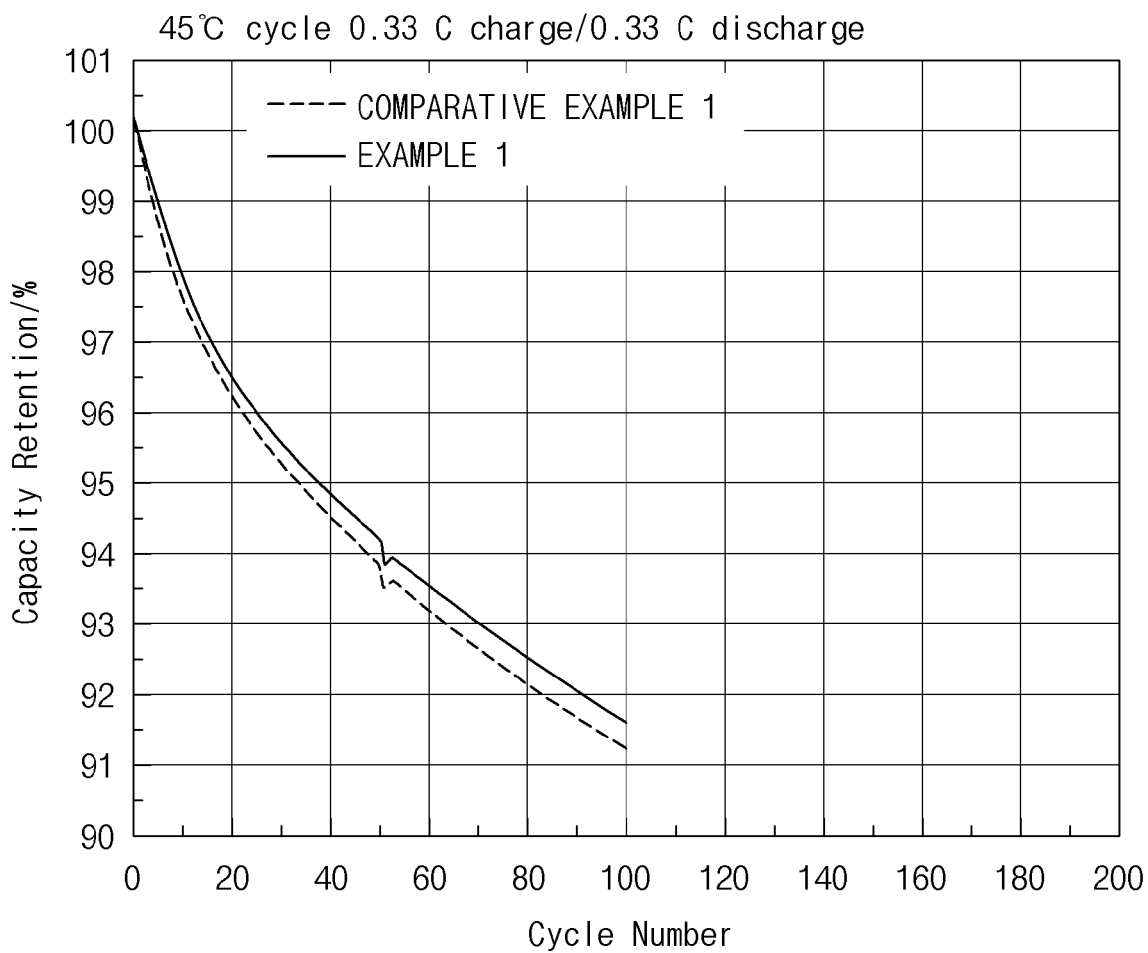
FIG. 2 is a graph illustrating the results of evaluation of capacity retentions (%) after high-temperature (45° C.) charge and discharge according to Experimental Example 2.

Referring to FIG. 2, it may be confirmed that the secondary battery of Example 1 had a higher battery capacity retention after high-temperature charge and discharge than the secondary battery of Comparative Example 1.

3. Experimental Example 3: Evaluation of Resistance Increase Rate (%) After High-Temperature (45° C.) Charge and Discharge After each of the secondary batteries prepared in Example 1 and Comparative Example 1 was activated at a constant current (CC) of 0.1 C, degassing was performed.

Thereafter, each secondary battery was charged at a CC of 0.33 C to 4.20 V under a constant current-constant voltage (CC-CV) condition at 25° C., then subjected to 0.05 C current cut-off, and discharged at a CC of 0.33 C to 2.5 V. The above charging and discharging were defined as one cycle, 3 cycles were performed, and, then, after each lithium secondary battery was charged to a state of charge (SOC) of 50%, DC-iR was calculated by a voltage drop obtained in a state in which each secondary battery was subjected to a discharge pulse at 2.5 C for 10 seconds, and the resistance measured was defined as initial resistance. The voltage drop was measured using PNE-0506 charge/discharge equipment (manufacturer: PNE SOLUTION Co., Ltd., 5 V, 6 A).

Then, 50 cycles, 100 cycles, and 200 cycles of the charging and discharging were performed under the same charge and discharge conditions as above at a high temperature (45° C.) In this case, after each secondary battery was charged to a state of charge (SOC) of 50% at 25° C. after each of the cycles (50 cycles, 100 cycles, and 200 cycles), DC-iR was calculated by a voltage drop obtained in a state in which each secondary battery was subjected to a discharge pulse at 2.5 C for 10 seconds. A resistance increase rate (%) calculated by substituting the DC-iR into the following [Equation 3] was illustrated in FIG. 3. In this case, the voltage drop was measured using PNE-0506 charge/discharge equipment (manufacturer: PNE SOLUTION Co., Ltd., 5 V, 6 A).

Resistance increase rate (%)={(resistance after $n$ cycles of charging and discharging−initial resistance)/initial resistance}×100   [Equation 3]

(In Equation 3, n is 50, 100, or 200.)

Figure 3:
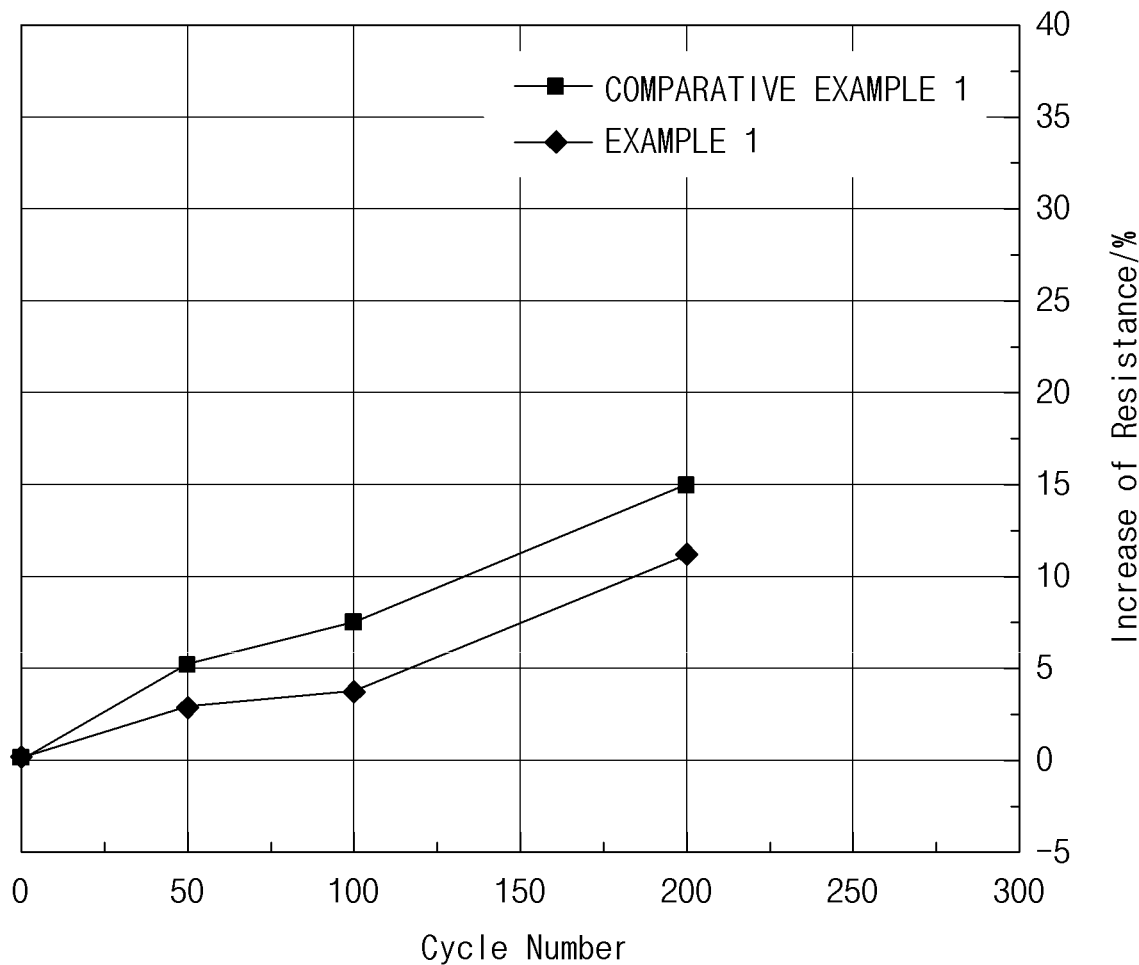
FIG. 3 is a graph illustrating the results of evaluation of resistance increase rates (%) after high-temperature (45° C.) charge and discharge according to Experimental Example 3.

Referring to FIG. 3, with respect to the secondary battery according to Example 1, since stable films were formed on the surfaces of the positive electrode and the negative electrode, an additional electrolyte decomposition reaction was suppressed even when charging and discharging were performed for a long time at a high temperature (45° C.), and thus, it may be confirmed that the resistance increase rate was lower than that of the secondary battery of Comparative Example 1.

4. Experimental Example 4: Evaluation of Resistance Increase Rate (%) and Capacity Retention (%) After High-Temperature (45° C.) Charge and Discharge (1) Resistance Increase Rate (%) Measurement After each of the secondary batteries prepared in Example 2 and Comparative Example 2 was activated at a constant current (CC) of 0.1 C, degassing was performed.

Thereafter, each secondary battery was charged at a CC of 0.33 C to 4.20 V under a constant current-constant voltage (CC-CV) condition at 25° C., then subjected to 0.05 C current cut-off, and discharged at a CC of 0.33 C to 2.5 V. The above charging and discharging were defined as one cycle, 3 cycles were performed, and, then, after each secondary battery was charged to a state of charge (SOC) of 50%, DC-iR was calculated by a voltage drop obtained in a state in which each secondary battery was subjected to a discharge pulse at 2.5 C for 10 seconds, and the resistance measured was defined as initial resistance. The voltage drop was measured using PNE-0506 charge/discharge equipment (manufacturer: PNE SOLUTION Co., Ltd., 5 V, 6 A).

Then, after 50 cycles of the charging and discharging were performed under the same charge and discharge conditions as above at a high temperature (45° C.), each secondary battery was charged to a state of charge (SOC) of 50% at 25° C., and DC-iR was then calculated by a voltage drop obtained in a state in which each secondary battery was subjected to a discharge pulse at 2.5 C for 10 seconds. A resistance increase rate (%) after 50 cycles, which was calculated by substituting the DC-iR into the following [Equation 4], was illustrated in FIG. 4 (lower graph). In this case, the voltage drop was measured using PNE-0506 charge/discharge equipment (manufacturer: PNE SOLUTION Co., Ltd., 5 V, 6 A).

Resistance increase rate (%)={(resistance after 50 cycles−initial resistance)/initial resistance}×100 [Equation 4]

Figure 4:
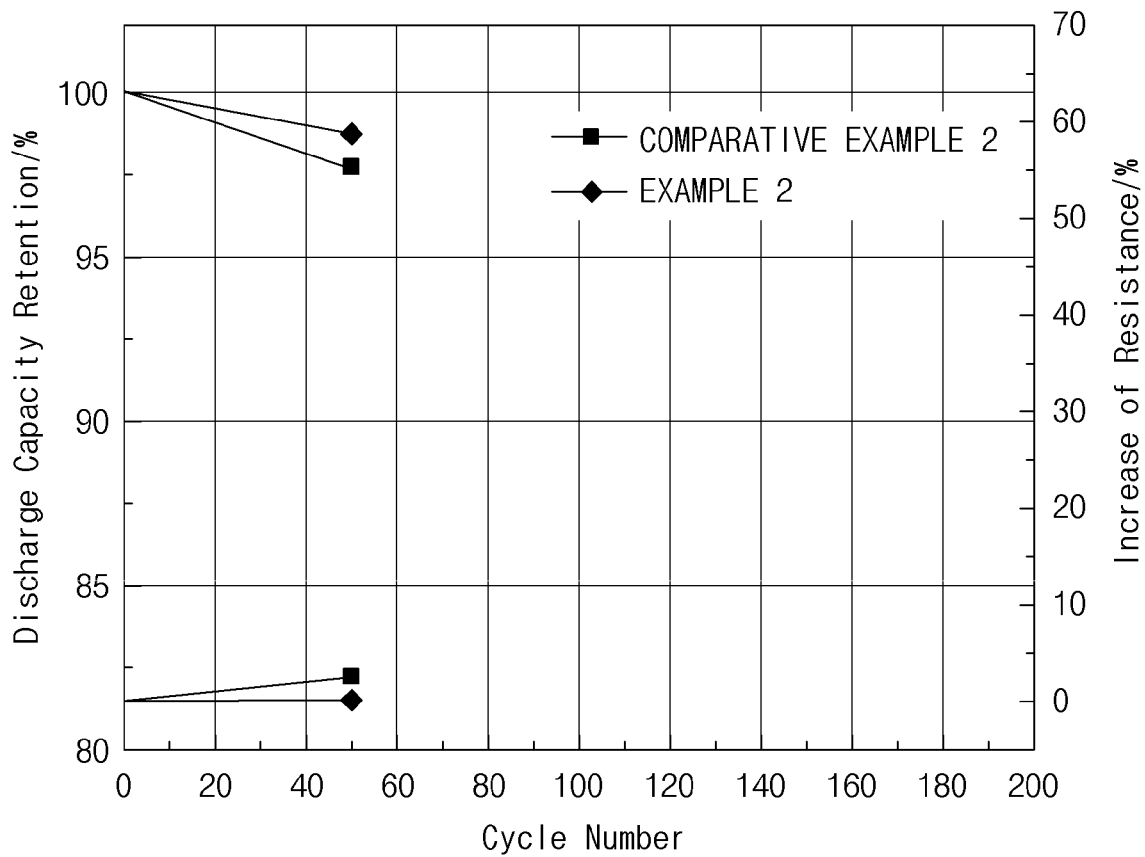
FIG. 4 is a graph illustrating the results of evaluation of resistance increase rates (%) and capacity retentions (%) after high-temperature (45° C.) charge and discharge according to Experimental Example 4.

Referring to FIG. 4 (lower graph), with respect to the battery according to Example 2, since stable films were formed on the surfaces of the positive electrode and the negative electrode, an additional electrolyte decomposition reaction was suppressed even when charging and discharging were performed for a long time at a high temperature (45° C.), and thus, it may be confirmed that the resistance increase rate was lower than that of the battery according to Comparative Example 2.

(2) Capacity Retention (%) Measurement

After each of the secondary batteries prepared in Example 2 and Comparative Example 2 was activated at a CC of 0.1 C, degassing was performed. Thereafter, each secondary battery was charged at a CC of 0.33 C to 4.20 V under a constant current-constant voltage (CC-CV) condition at 25° C., then subjected to 0.05 C current cut-off, and discharged at a CC of 0.33 C to 2.5 V.

Next, each secondary battery was charged at a CC of 0.33 C to 4.20 V under a constant current-constant voltage (CC-CV) condition at 45° C., then subjected to 0.05 C current cut-off, and discharged at a CC of 0.33 C to 2.5 V. The above charging and discharging were defined as one cycle, and, while 50 cycles of the charging and discharging were performed at a high temperature (45° C.), discharge capacities were measured using PNE-0506 charge/discharge equipment (manufacturer: PNE SOLUTION Co., Ltd., 5 V, 6 A). The discharge capacities measured were substituted into the following [Equation 4] to calculate capacity retention (%), and the results thereof are presented in FIG. 4 (upper graph).

Capacity retention (%)=(discharge capacity after 50 cycles/discharge capacity after 1 cycle)×100 [Equation 4]

Referring to FIG. 4 (upper graph), it may be confirmed that the secondary battery according to Example 2 had a higher capacity retention than the secondary battery of Comparative Example 2.

The invention claimed is:

1. An electrolyte for a lithium secondary battery, the electrolyte comprising:
   a lithium salt;
   an organic solvent; and
   a compound represented by Formula 1,

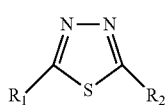

[Formula 1]

wherein, in Formula 1,
$R_1$ and $R_2$ are each independently an alkyl group having 1 to 3 carbon atoms.

2. The electrolyte of claim 1, wherein the compound comprises at least one of a compound represented by Formula 1A, a compound represented by Formula 1B, or a compound represented by Formula 1C,

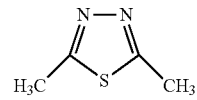

[Formula 1A]

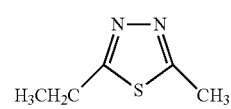

[Formula 1B]

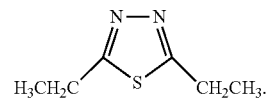

[Formula 1C]

3. The electrolyte of claim 1, wherein the compound is present in an amount of 0.1 part by weight to 10 parts by weight based on 100 parts by weight of the electrolyte.

4. The electrolyte of claim 1, wherein the compound is present in an amount of 0.1 part by weight to 5 parts by weight based on 100 parts by weight of the electrolyte.

5. The electrolyte of claim 1, wherein the compound is present in an amount of 0.1 part by weight to 3 parts by weight based on 100 parts by weight of the electrolyte.

6. The electrolyte of claim 1, wherein the lithium salt comprises $LiPF_6$.

7. The electrolyte of claim 1, further comprising at least one additive of a halogen-substituted or unsubstituted carbonate-based compound, a vinyl silane-based compound, a phosphate-based compound, a phosphite-based compound, a sulfite-based compound, a sulfone-based compound, a sulfate-based compound, a sultone-based compound, a halogen-substituted benzene-based compound, a nitrile-based compound, a borate-based compound, or a lithium salt-based compound.

8. The electrolyte of claim 7, wherein the at least one additive comprises at least one of the vinyl silane-based compound, the phosphate-based compound, the sulfate-based compound, the sultone-based compound, the halogen-substituted benzene-based compound, or the borate-based compound.

9. The electrolyte of claim 7, wherein the at least one additive is present in an amount of 1 part by weight to 40 parts by weight based on 100 parts by weight of the electrolyte.

10. A lithium secondary battery, comprising:
    a positive electrode;
    a negative electrode; and
    the electrolyte for a lithium of claim 1.

* * * * *